US012561295B2

(12) United States Patent
Xiao et al.

(10) Patent No.: US 12,561,295 B2
(45) Date of Patent: Feb. 24, 2026

(54) DATABASE REPAIRING METHOD AND ELECTRONIC DEVICE

(71) Applicant: HUAWEI TECHNOLOGIES CO., LTD., Guangdong (CN)

(72) Inventors: Mingpeng Xiao, Shenzhen (CN); Kai Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/245,476

(22) PCT Filed: Aug. 20, 2021

(86) PCT No.: PCT/CN2021/113838
§ 371 (c)(1),
(2) Date: Mar. 15, 2023

(87) PCT Pub. No.: WO2022/057567
PCT Pub. Date: Mar. 24, 2022

(65) Prior Publication Data
US 2023/0342345 A1 Oct. 26, 2023

(30) Foreign Application Priority Data

Sep. 16, 2020 (CN) .......................... 202010974792.8

(51) Int. Cl.
*G06F 16/00* (2019.01)
*G06F 11/1446* (2026.01)
*G06F 16/215* (2019.01)
(52) U.S. Cl.
CPC ........ *G06F 16/215* (2019.01); *G06F 11/1448* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 5,870,762 | A | * | 2/1999 | Lee .......................... G06F 16/10 |
| 6,567,826 | B1 | * | 5/2003 | Fischer ............... G06F 11/0706 |
| 6,970,890 | B1 | * | 11/2005 | Bruce ................. G06F 11/1435 |

(Continued)

FOREIGN PATENT DOCUMENTS

| | | | | |
|---|---|---|---|---|
| CN | 101038591 | A | 9/2007 | |
| CN | 107193871 | A * | 9/2017 | .......... G06F 11/1448 |

(Continued)

OTHER PUBLICATIONS

Liu, "Research and Application of SQLite Recovering Technology Based on WAL," Thesis for the degree of Master, Hangzhou Dianzi University, Mar. 2017, 78 pages (with English abstract).

(Continued)

*Primary Examiner* — Farhan M Syed
(74) *Attorney, Agent, or Firm* — Fish & Richardson P.C.

(57) ABSTRACT

Database repairing methods and electronic devices are disclosed. In an implementation, a method includes, in response to determining that a first database file is corrupted, obtaining data of at least one field in the first database file, wherein the at least one field is predefined by an application, and generating a first data table in a second database file based on the data of the at least one field, wherein the second database file is obtained through repairing.

12 Claims, 7 Drawing Sheets

(56)  References Cited

U.S. PATENT DOCUMENTS

| | | | | |
|---|---|---|---|---|
| 2012/0144383 A1* | 6/2012 | Mishra | ............... | G06F 11/1469 |
| | | | | 714/48 |
| 2013/0173547 A1* | 7/2013 | Cline | ................. | G06F 16/2365 |
| | | | | 707/684 |
| 2014/0201163 A1* | 7/2014 | Tipton | ............... | G06F 11/0706 |
| | | | | 707/686 |
| 2018/0285205 A1* | 10/2018 | Mehta | ................ | G06F 11/1456 |
| 2018/0285206 A1* | 10/2018 | Mehta | ................ | G06F 11/1464 |
| 2018/0285382 A1* | 10/2018 | Mehta | .................... | H04L 67/60 |
| 2018/0285430 A1* | 10/2018 | Mehta | ................. | G06F 16/248 |

FOREIGN PATENT DOCUMENTS

| | | |
|---|---|---|
| CN | 107402843 A | 11/2017 |
| CN | 109828865 A | 5/2019 |

OTHER PUBLICATIONS

Liu, "Handling SQL Server Page Corruption Failures," Cybersecurity and Informatization, Issue 6, Jun. 30, 2020, 6 pages (with English abstract).
Extended European Search Report in European Appln No. 21868395.
1, dated Jan. 15, 2024, 8 pages.
International Search Report and Written Opinion in International Appln. No. PCT/CN2021/113838, mailed on Nov. 18, 2021, 17 pages (with English translation).

* cited by examiner

Electronic device 100

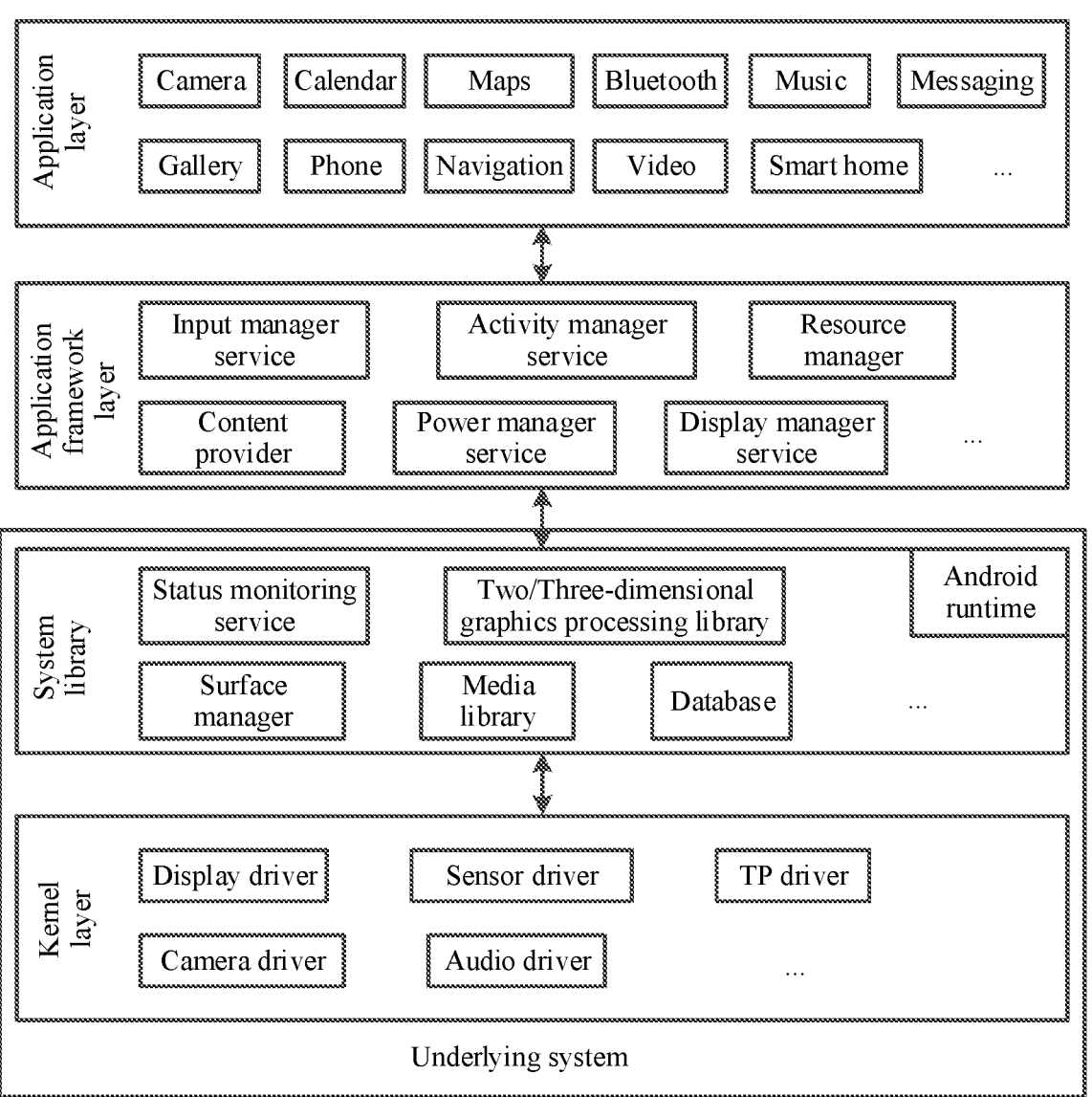

Application layer

| Camera | Calendar | Maps | Bluetooth | Music | Messaging |

| Gallery | Phone | Navigation | Video | Smart home | ... |

Application framework layer

| Input manager service | Activity manager service | Resource manager |

| Content provider | Power manager service | Display manager service | ... |

System library

| Status monitoring service | Two/Three-dimensional graphics processing library | Android runtime |

| Surface manager | Media library | Database | ... |

Kernel layer

| Display driver | Sensor driver | TP driver |

| Camera driver | Audio driver | ... |

Underlying system

410 — Determine that a database file is corrupted

420 — Back up the corrupted database file, to obtain a backup file

430

4301 — Determine whether key data in the backup file is corrupted

Yes

4303 — Obtain the key data from a master table

No

4302 — Obtain the key data from the backup file

440 — Insert the key data into a newly created database file, to obtain a repaired database file (a)                                    (b)

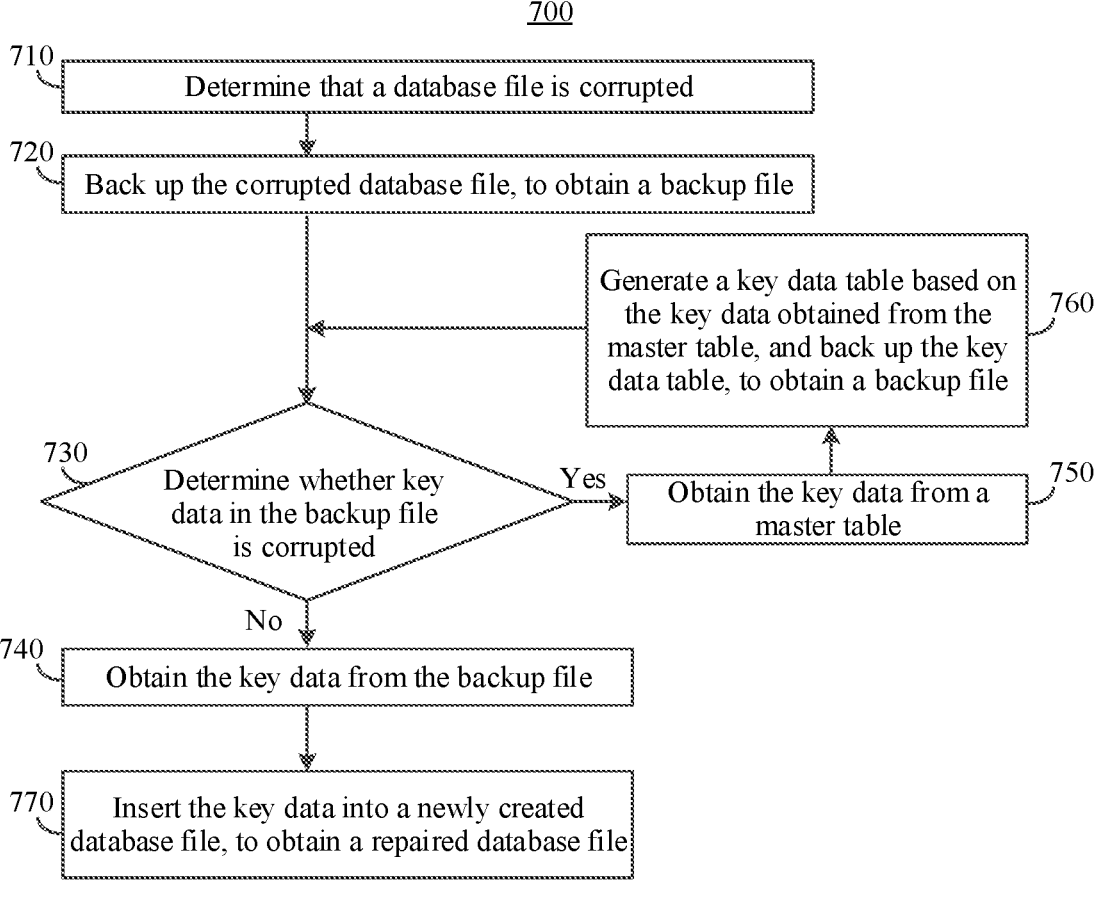

700

710 Determine that a database file is corrupted

720 Back up the corrupted database file, to obtain a backup file

760 Generate a key data table based on the key data obtained from the master table, and back up the key data table, to obtain a backup file 730 Determine whether key data in the backup file is corrupted Yes 750 Obtain the key data from a master table No 740 Obtain the key data from the backup file 770 Insert the key data into a newly created database file, to obtain a repaired database file

FIG. 7

DATABASE REPAIRING METHOD AND ELECTRONIC DEVICE

CROSS-REFERENCE TO RELATED APPLICATIONS

This application is a National Stage of International Application No. PCT/CN2021/113838, filed on Aug. 20, 2021, which claims priority to Chinese Patent Application No. 202010974792.8, filed on Sep. 16, 2020, both of which are hereby incorporated by reference in their entireties.

TECHNICAL FIELD

This application relates to the computer field, and in particular, to a database repairing method and an electronic device.

BACKGROUND

A structured query language lite (structured query language lite, SQLite) database is widely applied currently. The SQLite database a lightweight relational database, and is applicable to various embedded devices such as a mobile phone, a personal digital assistant (personal digital assistant, PDA), and a set top box. A database used by many applications (application, APP) is a SQLite database.

However, the SQLite database is easily affected by an environment and then corrupted. Featured by a lightweight characteristic, the SQLite database does not provide a reliable repairing mechanism. Once the database is corrupted, even if a specific table in the database is corrupted, entire data possibly cannot be accessed. If the database is recreated, all originally stored data is lost. Therefore, a user may need to re-enter the lost data into the recreated database, and user experience is poor.

SUMMARY

Embodiments of this application provide a database repairing method and an electronic device, so that a corrupted database file is self-repaired, to avoid interference to and impact on a user as much as possible, and improve user experience.

According to a first aspect, a database repairing method is provided. The method may be performed by, for example, an electronic device, or more specifically, may be performed by a processor in the electronic device. One or more applications may be installed in the electronic device. Each application may store data by using a corresponding database.

Specifically, the method includes: when a first database file is corrupted, obtaining data of at least one field in the first database file, where the at least one field is predefined by an application; and generating a first data table based on the data of the at least one field, where the first data table exists in a second database file obtained through repairing.

It should be understood that the second database file is a database file obtained through self-repairing based on corruption of the first database file.

Based on the technical solution, in this embodiment of this application, the application predefines one or more fields. When a database file is corrupted, data of the one or more fields is automatically obtained, to obtain important data from the corrupted database file, and reduce impact on a user. In addition, the data is automatically obtained, and a data table is generated, to reduce interference to the user. In general, user experience can be improved.

In a possible design, the at least one field is a field that is defined based on an application and that is used to carry important data, for example, may be referred to as a key field. A data carried in the at least one field may be referred to as key data.

Based on this design, in this embodiment of this application, when the database file is corrupted, the key data may be automatically obtained, and the database file is repaired, to avoid losing the important data such as the key data, avoid exerting serious impact on life and work of the user, and help improve user experience.

With reference to the first aspect, in some implementations of the first aspect, the method further includes: backing up the first database file, to obtain a backup file of the first database file.

Specifically, the first database file may be directly stored as a backup file, and a file name of the backup file may be defined based on a predefined naming rule. For example, a file name of the first database file is "xxx.db", and a file name of the backup file of the first database file is "xxx-corrupted.db". Herein, "xxx" may represent a database file name corresponding to the application, and herein may represent the file name of the first database file, and "corrupted" represents corrupted or corrupted, to be distinguished from the file name "xxx.db" of the first database file.

It should be understood that the backup file is defined only to be distinguished from the first database file, and the file name of the backup file is also defined only to be distinguished from a file name of a corrupted database file (for example, the first database file). These names should not constitute any limitation on this embodiment of this application. The file name is not limited in this embodiment of this application.

The first database file is backed up, to avoid a risk of losing all data when the first database file is deleted.

With reference to the first aspect, in some implementations of the first aspect, the data of the at least one field is obtained from the backup file of the first database file.

A short period of time is consumed to obtain data from the backup file of the first database file, and is usually approximately 20 seconds. Therefore, the data can be restored in a short period of time.

Optionally, the obtaining data of at least one field in the first database file includes: when a second data table in the backup file of the first database file is not corrupted, obtaining the data of the at least one field from the second data table. The second data table is a table used to store the data of the at least one field.

It should be understood that the first data table and the second data table each can be understood as a data table used to carry the data of the at least one field. When the at least one field is a key field, the first data table and the second data table each may be referred to as a key data table.

A difference lies in that the first data table is a table generated by self-repairing the database, the first data table exists in the second database file, and the second data table is a table existing in the backup file, in other words, is a table obtained by backing up the first database file. In this implementation, if the second data table is not corrupted, the data of the at least one field may be directly obtained from the second data table, to generate the first data table.

With reference to the first aspect, in some implementations of the first aspect, the data of the at least one field is obtained from a master (master) table of the first database file, and the master table stores a statement and data that are used to generate the first database file.

The data of the at least one field is obtained from the master table. It is equivalent to that a statement (for example, a statement for inserting the at least one field) used to generate the second data table in the first database file is executed once again. Compared with a previous implementation, in this implementation, a long period of time is consumed, and is usually approximately 1 minute.

Optionally, the obtaining data of at least one field in the first database file includes: when a second data table in a backup file of the first database file is corrupted, obtaining the data of the at least one field from the master table. The second data table is a table used to store the data of the at least one field.

It should be understood that the master table corresponds to the first database file, but is not necessarily stored in a same directory as the first database file. It should be further understood that a difference between the first data table and the second data table is described above. For brevity, details are not described herein again.

Based on the foregoing solution, when the first database file is corrupted, it may be preferentially considered that data is obtained from the second data table of the first database file. If the second data table is corrupted, data is restored from the master table. Therefore, database repairing duration can be shortened to a maximum extent.

With reference to the first aspect, in some implementations of the first aspect, the second database file is a database file obtained through creation and repairing when the first database file is corrupted.

In other words, when it is determined that the first database file is corrupted, a database file may be newly created. The newly created database file is a database file that does not store data. A second database file that stores at least some data (for example, the data of the at least one field) may be obtained through repairing.

Optionally, the second database file and the first database file have a same file name and a same structure.

In other words, the second database file is a database file that is obtained after repairing and that is used to replace the first database file. After the database is repaired, if the user starts the application, the application may automatically access the second database file.

Optionally, the method further includes: deleting the first database file.

The first database file is deleted, to avoid an access error caused when there are two database files (namely, the first database file and the second database file) with a same file name during subsequent access. In a possible implementation, the first database file is deleted after the first database file is backed up. In another possible implementation, the first database file is directly renamed.

According to a second aspect, a database repairing apparatus is provided, including modules or units configured to perform the method in any possible implementation of the first aspect. It should be understood that the following modules or units may implement corresponding functions by executing a computer program. The computer program may be provided by an application, or the computer program may be provided by an electronic device on which the application is installed. This is not limited in this application.

For example, the apparatus includes an obtaining unit and a generation unit. The obtaining unit may be configured to: when a first database file is corrupted, obtain data of at least one field in the first database file. The at least one field is predefined by an application. The generation unit may be configured to generate a first data table based on the data of the at least one field. The first data table exists in a second database file obtained through repairing.

With reference to the second aspect, in some implementations of the second aspect, the apparatus further includes a backup unit, configured to back up the first database file, to obtain a backup file.

With reference to the second aspect, in some implementations of the second aspect, the data of the at least one field is obtained from the backup file of the first database file.

Optionally, the obtaining unit is specifically configured to: when a second data table in the backup file of the first database file is not corrupted, obtain the data of the at least one field from the second data table. The second data table is a table used to store the data of the at least one field.

With reference to the second aspect, in some implementations of the second aspect, the data of the at least one field is obtained from a master table of the first database file, and the master table stores a statement and data that are used to generate the first database file.

Optionally, the obtaining unit may be specifically configured to: when a second data table in the backup file of the first database file is corrupted, obtain the data of the at least one field from the master table. The second data table is a table used to store the data of the at least one field.

With reference to the second aspect, in some implementations of the second aspect, the second database file is a database file obtained through creation and repairing when the first database file is corrupted.

Optionally, the second database file and the first database file have a same file name and a same structure.

Optionally, the apparatus further includes a deletion unit, configured to delete the first database file.

According to a third aspect, an electronic device is provided. An application is installed in the electronic device, the application stores data by using a corresponding database, and the electronic device includes a memory and a processor. The memory may be configured to store a computer program. The processor may be configured to invoke the computer program in the memory, so that the electronic device performs the method in any possible implementation of the first aspect.

According to a fourth aspect, a computer program product is provided. The computer program product includes a computer program (which may also be referred to as code or instructions). When the computer program is run, an electronic device is enabled to perform the method in any possible implementation of the first aspect.

According to a fifth aspect, a computer-readable storage medium is provided. The computer-readable storage medium stores a computer program (which may also be referred to as code or instructions). When the computer program is run, an electronic device is enabled to perform the method in any possible implementation of the first aspect.

With reference to the foregoing aspects, in some implementations, the database is a SQLite database.

It should be understood that, as an example of the database, the SQLite database should not constitute any limitation on this embodiment of this application. The database repairing method provided in this application may be further applied to another database, for example, another database that can be embedded into an application. For brevity, examples are not listed one by one herein.

BRIEF DESCRIPTION OF DRAWINGS

FIG. 2 is a block diagram of a software structure of an electronic device applicable to a database repairing method according to an embodiment of this application;

FIG. 7 is a schematic flowchart of a database repairing method according to another embodiment of this application.

DESCRIPTION OF EMBODIMENTS

Figure 1:
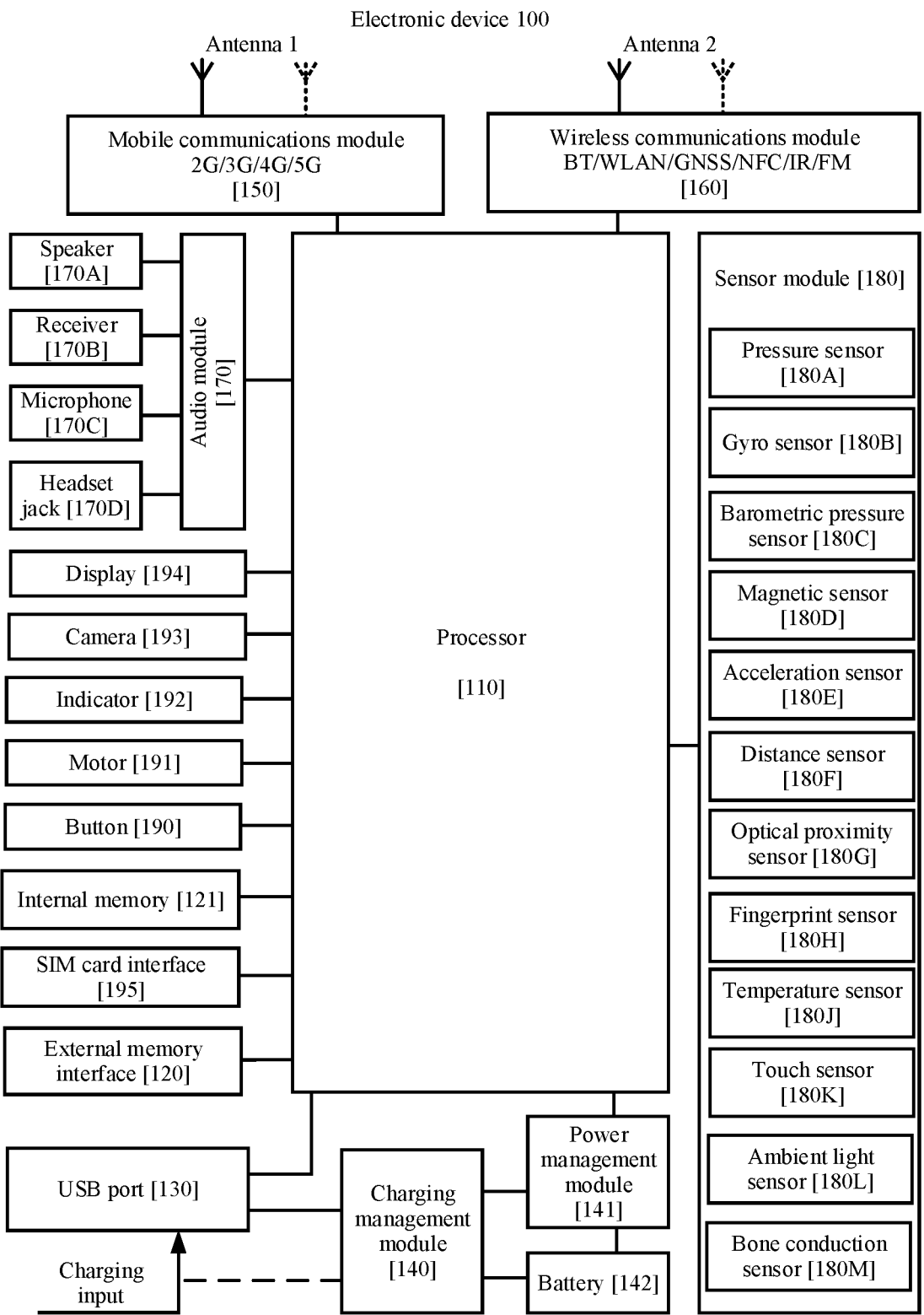
FIG. 1 is a schematic diagram of a structure of an electronic device applicable to a database repairing method according to an embodiment of this application.

The following describes technical solutions of this application with reference to the accompanying drawings.

To help understand embodiments of this application, terms used in this specification are first briefly described.

1. A database is a warehouse that organizes, stores, and manages data based on a data structure. The database stores data in a specific format. A user may perform operations such as addition, modification, deletion, and querying on data in the database.

In embodiments of this application, the database is mainly a database file. It should be understood that, in addition to the database file, the database may further include another component such as an interface.

2. A database file may be a file that stores data in a database. An SQL database file may be identified, for example, by an extension "db", for example, "xxx.db". Herein, "xxx" indicates a database name, and "db" indicates an extension.

The data in the database is organized in a unit of a data table (to help distinguish between the data table and a data (data) table in a database file of an application "Contacts" listed in the following embodiments, the data table is briefly referred to as a table (table) herein). The table exists in the database file. The table may include a group of data records. For example, one table may be a group of related data arranged by row. Each table may include one or more pieces of data of a same type. A database of "Contacts" is used as an example. Each row of the table may correspond to one contact, and each row may include one or more pieces of data in a mobile phone number, a landline number, a home address, a call record, a quantity of contact times, and the like of the corresponding contact.

Each row in the table is referred to as a record (record), and includes several fields (field). The data in the table may be modified by using a structured query language (structured query language, SQL) statement such as update (update), insert (insert), or delete (delete).

The field is also referred to as a field. Each column in the table may be referred to as a field. Each field has corresponding description information, for example, a data type or a data width. Each field may be filled with pieces of data based on the data type and the data width specified for the field.

To improve efficiency of accessing the database, an index may be used for the database. The index is a special type of table, and includes a value of a key field and a pointer pointing to an actual record location. The value and the pointer may be stored in a specific sequence, so that a required data record can be found at a fast speed. Both the value of the key field and the specific sequence may be defined by a user.

3. A database structure is a structure of an associated structured data set that is properly stored in a storage device. One database structure may include a table, a record, a field, a filter (filter), and the like. For descriptions of the table, the record, and the field, refer to the foregoing related descriptions. For brevity, details are not described herein again. The filter is an integral part of a database. The filter combines an index and a sequence, to set a condition and output required data based on a given condition.

4. A view (view) is a result set obtained by combining one or more tables based on a specific condition. For example, the view may be obtained by rearranging data in one or more tables based on an expected logical structure by using code. Usually, the view is controlled by using a filter and an index. The view may alternatively exist in a database file.

5. A SQLite database is a lightweight embedded database in a process. The SQLite database does not need to be configured in a system, and may be used directly. In addition, a database service does not need to be separately purchased for the SQLite database, and a server process is not required. Therefore, configuration costs are almost zero. The SQLite3 database is a new version of the SQLite database. For ease of description, the SQLite database and the SQLite3 database are collectively referred to as the SQLite database in this specification.

The SQLite database is a relational database. A storage format of the relational database may directly reflect a relationship between entities. The relational database may store data in a structured manner. Each field needs to be predefined for each data table (in other words, a table structure needs to be predefined), and then, data is stored based on the table structure. In this way, a form and content of the data are defined before the data is stored.

Most relational databases conform to a structured query language (structured query language, SQL) standard. Common operations include a querying operation, an addition operation, an updating operation, a deletion operation, a summation operation, and a sorting operation.

A database repairing method provided in embodiments of this application may be applied to an electronic device such as a mobile phone, a tablet computer, a wearable device, a vehicle-mounted device, an augmented reality (augmented reality, AR)/virtual reality (virtual reality, VR) device, a notebook computer, a personal computer (personal computer, PC), an ultra-mobile personal computer (ultra-mobile personal computer, UMPC), a netbook, a personal digital assistant (personal digital assistant, PDA), or a distributed device. A specific type of the electronic device is not limited in embodiments of this application.

In addition, a database in embodiments of this application may support Linux, Android (Android), a Harmony operating system (Harmony Operating System, Harmony OS), Mac, iOS, Windows, an internet of things operating system (for example, a LiteOS), and the like. This is not limited in embodiments of this application.

For example, FIG. 1 is a schematic diagram of a structure of an electronic device 100. As shown in FIG. 1, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The application processor outputs a sound signal by using the audio module 170 (for example, a speaker 170A), or displays an image or a video by using the display 194.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the processor may directly invoke the instructions or the data from the memory. In this case, repeated access is avoided, a waiting time period of the processor 110 is reduced, and efficiency of a system is improved.

The processor 110 may perform different operations by executing instructions, to implement different functions. For example, the instruction may be an instruction prestored in the memory before the device is delivered from a factory, or may be an instruction read from a new application (application, APP) after a user installs the app. This is not limited in this embodiment of this application.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be used for audio communication, and analog signal sampling, quantization, and coding. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI, to implement a display function of the electronic device 100.

The GPIO interface may be configured by using software. The GPIO interface may be configured as a control signal, or may be configured as a data signal. In some embodiments, the GPIO interface may be configured to connect the processor 110 and the camera 193, the display 194, the wireless communications module 160, the audio module 170, the sensor module 180, or the like. The GPIO interface may be further configured as the I2C interface, the I2S interface, the UART interface, the MIPI interface, or the like.

The USB port 130 is an interface that conforms to a USB standard specification, and may be specifically a mini USB port, a micro USB port, a USB Type C interface, or the like. The USB port 130 may be configured to be connected to the charger to charge the electronic device 100, or may be configured to transmit data between the electronic device 100 and a peripheral device, or may be configured to be connected to a headset, to play audio by using the headset. The interface may be further configured to be connected to another electronic device, for example, an AR device.

It can be understood that an interface connection relationship between modules illustrated in this application is merely an example for description, and does not constitute a limitation on the structure of the electronic device 100. In some other embodiments, different interface connection manners in the foregoing embodiments or a combination of a plurality of interface connection manners may alternatively be used for the electronic device 100.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. While charging the battery 142, the charging management module 140 may further supply power to the electronic device by using the power management module 141.

The power management module 141 is configured to be connected to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communications module 160, or the like. The power management module 141 may be further configured to monitor parameters such as a battery capacity, a quantity of battery cycles, and a battery health status (for example, leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, or the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that is applied to the electronic device 100 and that includes 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal that is obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), a 5th generation (5th generation, 5G) communications system, BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric computation, and is configured to perform graphics rendering. The processor 110 may include one or more GPUs, and execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED (mini-LED), a micro-LED (micro-LED), a micro-OLED (micro-OLED), a quantum dot light-emitting diode (quantum dot light-emitting diodes, QLED), or the like. In some embodiments, the electronic device 100 may include one or more displays 194.

The electronic device 100 may implement the photographing function by using the ISP, the camera 193, the video codec, the GPU, the display 194, the application processor, or the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format of RGB, YUV, or the like. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform or the like on energy of the frequency.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The external memory interface 120 may be used to be connected to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to execute various function applications and data processing of the electronic device 100. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, or may include a nonvolatile memory such as at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode the audio signal. In some embodiments, the audio module 170 may be disposed in the processor 110, or some functional modules of the audio module 170 may be disposed in the processor 110.

The speaker 170A, also referred to as a "horn", is configured to convert an electrical audio signal into a sound signal. The electronic device 100 may be used to listen to music or answer a call in a hands-free mode through the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending audio information, the user may make a sound near the microphone 170C through the mouth of the user, to enter a sound signal into the microphone 170C. The electronic device 100 may be provided with at least one microphone 170C. In some other embodiments, the electronic device 100 may be provided with two microphones 170C, to implement a noise reduction function in addition to collecting a sound signal. In some other embodiments, three, four, or more microphones 170C may alternatively be disposed in the electronic device 100, to collect a sound signal, implement noise reduction, and identify a sound source, so as to implement a directional recording function, and the like.

The headset jack 170D is configured to be connected to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

A layered architecture, an event-driven architecture, a microkernel architecture, a microservice architecture, or a cloud architecture may be used for a software system of the electronic device 100. In this application, an Android system with a layered architecture is used as an example to describe a software structure of the electronic device 100. A type of an operating system of the electronic device is not limited in this application, for example, an Android system or a Harmony OS.

FIG. 2 is a block diagram of a software structure of an electronic device applicable to a database repairing method according to an embodiment of this application. As shown in FIG. 2, in a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 2, the application package may include applications such as Camera, Gallery, Calendar, Phone, Maps, Navigation, WLAN, Bluetooth, Music, Video, Game, Shopping, Travel, Instant messaging (for example, Messaging), Smart home, and Device control.

The application Smart home may be used to control or manage a home device having a networking function. For example, the home device may include an electric light, a television, and an air conditioner. For another example, the home device may further include an anti-theft door lock, a sound box, a floor sweeping robot, a socket, a body fat scale, a desk lamp, an air purifier, a refrigerator, a washing machine, a water heater, a microwave oven, an electric cooker, a curtain, a fan, a television, a set top box, a door, and a window.

The application framework layer provides an application programming interface (application programming interface, API) and a programming framework for an application at the application layer. The application framework layer includes some predefined functions. As shown in FIG. 2, the application framework layer may include an input manager service (input manager service, IMS). Certainly, the application framework layer may further include a display policy service, a power manager service (power manager service, PMS), a display manager service (display manager service, DMS), an activity manager service, a resource manager, a content provider, a view system, a phone manager, a notification manager, a window manager, and the like. This is not limited in this embodiment of this application.

The window manager is configured to manage a window program. The window manager may obtain a size of a display, and determine whether there is a status bar, a lock screen, a screen capture, or the like.

The content provider is configured to store and obtain data, and enable the data to be accessed by an application. The data may include a video, an image, audio, a made call, an answered call, a browsing history and bookmark, a phonebook, and the like.

The view system includes a visual control, for example, a control for displaying a text, or a control for displaying a picture. The view system may be configured to construct an application. A display interface may include one or more views. For example, a display interface including a message notification icon may include a view for displaying a text and a view for displaying a picture.

The phone manager is configured to provide a communication function for the electronic device 100, for example, management of a call status (including answering, declining, or the like).

The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction. For example, the notification manager is configured to: notify that downloading is completed, or prompt a message. The notification manager may alternatively be a notification that appears in a top status bar of the system in a form of a graph or a scroll bar text, for example, a notification of an application running in the background or a notification that appears on a screen in a form of a dialog window. For example, text information is prompted in the status bar, a prompt tone is produced, the electronic device vibrates, or an indicator blinks.

The Android runtime may include a core library and a virtual machine. The Android runtime is responsible for scheduling and management of the Android system.

The core library may include two parts: One part is a function that needs to be called in java language, and the other part is a core library of the Android system.

The application layer and the application framework layer run on a virtual machine. The virtual machine converts a java file at the application layer and the application framework layer into a binary file for execution. The virtual machine is configured to perform functions such as object lifecycle management, stack management, thread management, security and exception management, and garbage collection.

The system library may include a plurality of functional modules, for example, a status monitoring service, a surface manager (surface manager), a media library (media libraries), a three-dimensional graphics processing library (for example, OpenGLES), and a two-dimensional (2 dimensions, 2D) graphics engine (for example, SGL).

The status monitoring service is used to determine a specific direction of the mobile phone, a physical status of a flexible display, and the like based on monitoring data reported by the kernel layer. The surface manager is configured to manage a display subsystem, and provide fusion of 2D and three-dimensional (3 dimensions, 3D) layers for a plurality of applications. The media libraries support playback and recording of a plurality of common audio and video formats, a still image file, and the like. The media library may support a plurality of audio and video encoding formats such as MPEG-4, H.264, MP3, AAC, AMR, JPG, and PNG. The three-dimensional graphics processing library is configured to implement three-dimensional graphics drawing, image rendering, composition, layer processing, or the like. The 2D graphics engine is a drawing engine for 2D drawing.

In this embodiment of this application, the system library may further include a database, for example, the foregoing SQLite database. The SQLite database is an embedded database, is a main component of an application, and can directly run in a process of the application. The following describes an architecture of the SQLite database with reference to FIG. 3. For brevity, details are not described herein again.

The kernel layer is a layer between hardware and software. The kernel layer includes at least a display driver, a camera driver, an audio driver, and a sensor driver. This is not limited in this embodiment of this application.

Still as shown in FIG. 2, the system library, the kernel layer, and the like below the application framework layer may be referred to as an underlying system. The underlying system includes an underlying display system, configured to provide a display service. For example, the underlying display system includes a display driver at a kernel layer, and a surface manager in a system library.

It can be understood that the structure illustrated in this application does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by using hardware, software, or a combination of software and hardware.

Figure 3:
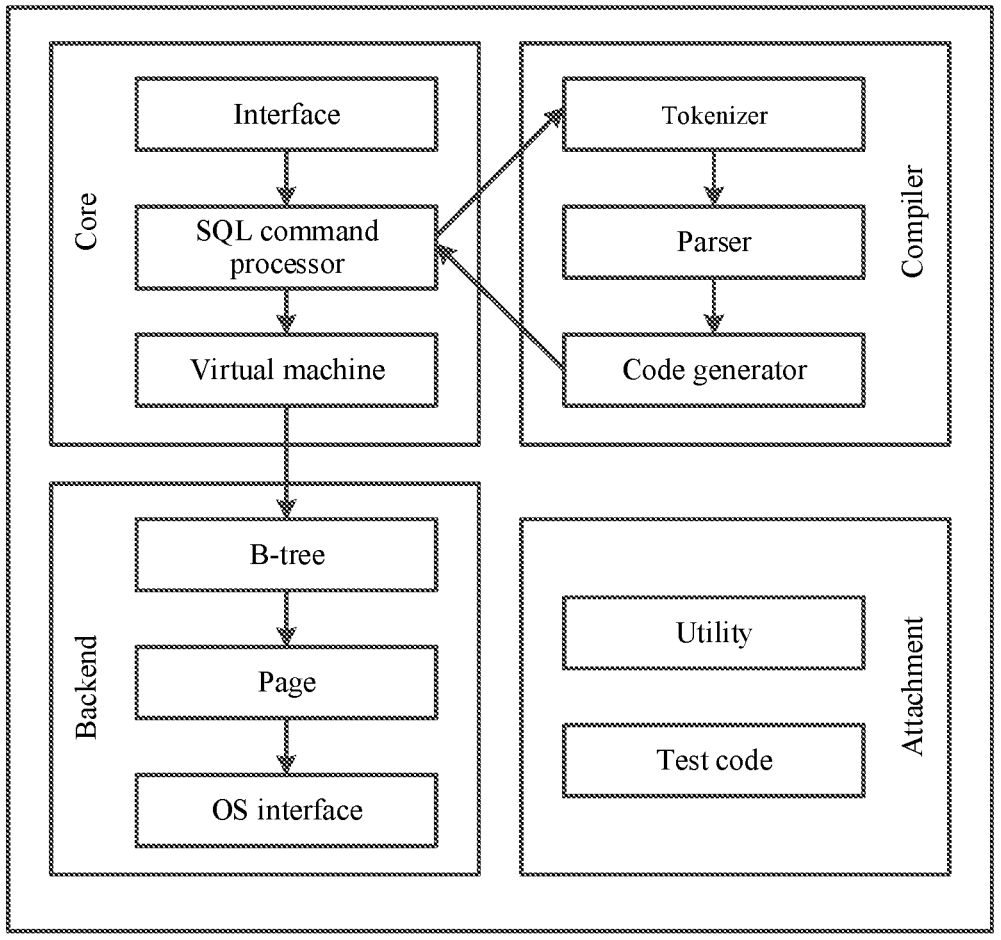
FIG. 3 is a schematic diagram of an architecture of a SQLite database according to an embodiment of this application.

FIG. 3 is a schematic diagram of an architecture of a SQLite database according to an embodiment of this application. FIG. 3 shows components and mutual operations in the SQLite database. The SQLite database includes a core (core), a compiler (compiler), and a backend (backend). The core includes an interface (interface), an SQL command processor (SQL command processor), and a virtual machine (virtual machine). The compiler includes a tokenizer (tokenizer), a parser (parser), and a code generator (code generator). The backend includes a B-tree (B-tree), a page cache (page cache, pager), and an operating system interface (OS interface). The SQLite database may further include an attachment, and the attachment includes a utility (utilities) and test code (test code). The following describes each component in detail.

An operating procedure of SQLite is mainly to compile an SQL text into a byte code (byte code) and run the byte code on the virtual machine.

Specifically, the interface may specifically be a C language interface. The interface includes a SQLite API. A program, a script language, and a library file each may interact with the SQLite database through the interface. For example, the interface may send the SQL text from an outside to the SQL command processor.

To compile one SQL text, the SQL command processor first sends the SQL text to the compiler. In the compiler, the tokenizer and the parser may perform a syntax check on an SQL statement, and then convert the SQL statement into a layered data structure (namely, a syntax tree) that can be more easily processed by a bottom layer. For example, the tokenizer may decompose the SQL text into words, and then sends the words to the parser one by one. The parser may assign semantics to the words based on context of the words.

The parser converts the word into a syntax tree, and sends the syntax tree to the code generator. The code generator analyzes the syntax tree, and generates a byte code that complies with an SQL function. A byte code output by the code generator is finally executed by the virtual machine (virtual machine).

A B-tree and a page cache jointly manage data. A main function of the B-tree is indexing, and maintains a complex relationship between pages, to help quickly find required data. The page cache transfers the page between the B-tree and a disk through the OS interface.

The OS interface is an interface invoked by a system. To provide inter-operating system portability, the SQLite uses an abstract object whose name is a virtual file system (virtual file system, VFS). Each VFS provides a method for opening, closing, reading, and writing a disk file, and another operating system-specific function. For example, a random seed is set for a pseudo-random number generator at a current time point. For example, the SQLite currently provides the VFS for Unix and Windows.

The utility (utilities) may also be referred to as a generic library and may be used to implement memory allocation, a string comparison routine, a portable string-to-number conversion routine, or the like.

In a src folder, a file starting with test is test code and is not included in a standard library version.

It should be understood that the foregoing briefly describes the architecture of the SQLite database with reference to FIG. 3. However, this is merely shown for ease of understanding, and shall not constitute any limitation on this embodiment of this application.

As mentioned above, a database file of each application may include one or more tables and one or more views. The view may be obtained by combining data in one or more tables. When accessing the database file, the application may usually generate different views based on different commands. The view is usually generated by using a plurality of associated tables based on a logical structure corresponding to the command. If one table in the database file is corrupted, the view cannot be generated. In other words, if some data in the database file is corrupted, the entire data possibly cannot be accessed normally.

When a user opens the application to access the database file, the background usually generates a view based on a plurality of associated tables based on a user operation, and then displays related data in a user interface. If data in the database file is corrupted, the view cannot be generated, and the user cannot read the data in the database file.

The SQLite database is easily affected by an environment and then corrupted. For example, the SQLite database is corrupted in a case of a file synchronization failure, file system corruption, a storage anomaly, insufficient space, out-of-bounds accessing, a power failure, or a case in which a third-party application accesses and performs writing into the database (for example, due to openness of the SQLite database, the SQLite database supports accessing by the third-party application, and a concurrency problem may occur when a plurality of applications simultaneously perform accessing). It should be understood that, that the database is corrupted may usually mean that a database file is corrupted. For example, some or all tables are corrupted. Correspondingly, repairing the database may be repairing the database file.

The SQLite database does not provide a reliable repairing mechanism. Once the SQLite database is corrupted, even if a specific table is corrupted, the entire data cannot be accessed. When the user starts the SQLite database, originally stored data cannot be accessed.

If the database is recreated, the originally stored data is deleted even if the originally stored data is not corrupted. Consequently, all data in the database is lost. The user may need to re-enter the data originally stored in the application. For example, if a SQLite database of an application "Contacts" is corrupted, the user may need to enter the lost data again, for example, a name of a contact or a contact manner. Consequently, an unnecessary workload is brought to the user, and serious impact is exerted on life and work of the user due to a data loss, resulting in poor user experience.

Embodiments of this application provide a database repairing method and an electronic device. To avoid poor user experience caused by recreation when a database is corrupted, this application proposes an idea of obtaining key data and repairing the database file based on the key data. Therefore, when the database is corrupted, the key data can be restored as much as possible, to avoid an unnecessary repeated operation of the user, reduce impact on life and work of the user, and improve user experience.

The following describes in detail the method provided in embodiments of this application with reference to the accompanying drawings. It should be understood that the method embodiment shown below may be performed by, for example, the electronic device. Specifically, the method embodiment may be performed by a processor installed in the electronic device by invoking a corresponding computer program (or referred to as code or instructions). The electronic device may be an electronic device on which an application is installed, and the application may store data by using a database (for example, a SQLite database). The computer program may be provided by the application, for example, provided by an application developer. After the application is installed in the electronic device, the computer program may be stored in storage space corresponding to the application in a memory of the electronic device. Alternatively, the computer program may be prestored in the electronic device, for example, provided by an electronic device manufacturer. When executing the computer program to repair a database file of an application, the processor in the electronic device may invoke a related parameter in the application, to perform corresponding repairing on a database of a different application. Alternatively, the application may request to send a related parameter to the processor in the electronic device, to perform repairing based on the related parameter. The related parameter may include, for example, a definition of the key field, a naming rule of the database file, or a storage address of the database file. This is not limited in embodiments of this application.

For ease of description, the following describes a specific procedure of a method embodiment by using an electronic device as an execution body.

Figure 4:
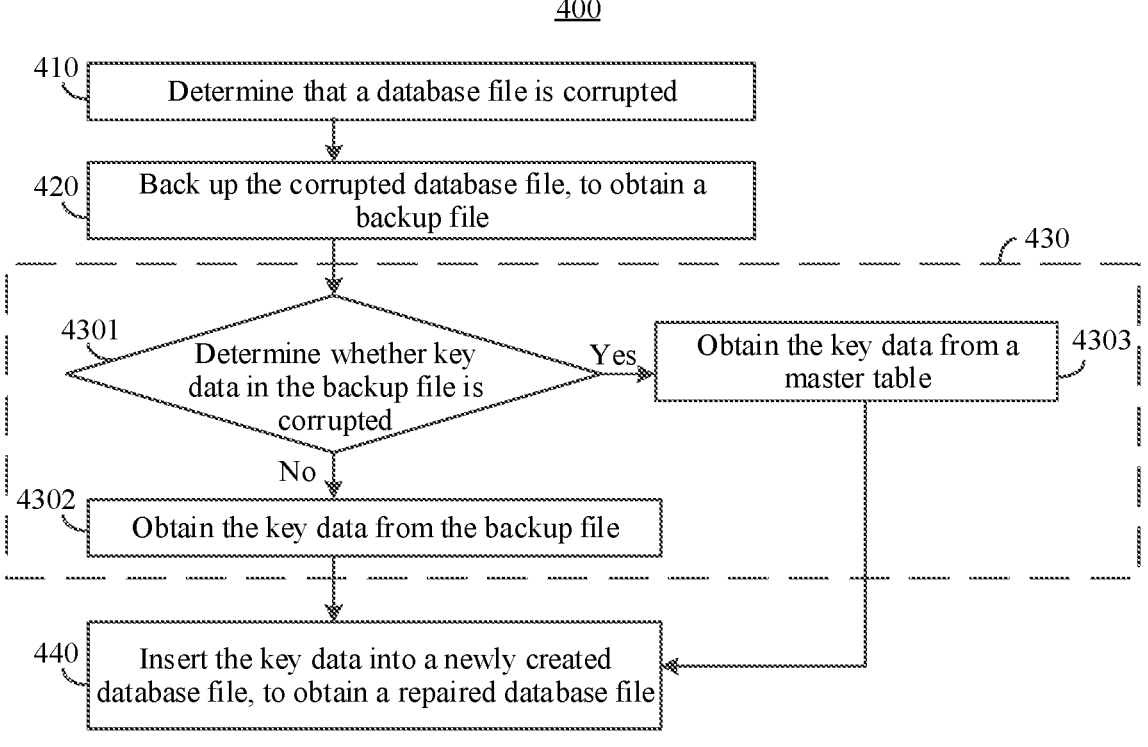
FIG. 4 is a schematic flowchart of a database repairing method according to an embodiment of this application.

FIG. 4 is a schematic flowchart of a database repairing method 400 according to an embodiment of this application. As shown in FIG. 4, the method 400 may include steps 410 to 440. The following describes in detail each step in the method 400.

Step 410: Determine that a database file is corrupted.

As described above, each application may store data by using a database. A database of each application may store one or more tables and one or more views. The tables and the views exist in the database file. Once a specific table is corrupted, for example, some or all data in the specific table is corrupted, the entire database file cannot be accessed normally.

In a possible case, when a user starts an application, a processor in an electronic device may invoke data in the application by using a database interface. However, if data in the database is corrupted, the database cannot be accessed normally. In this case, the electronic device may determine that the database is corrupted. The user may not find originally stored data after starting the application.

Figure 5:
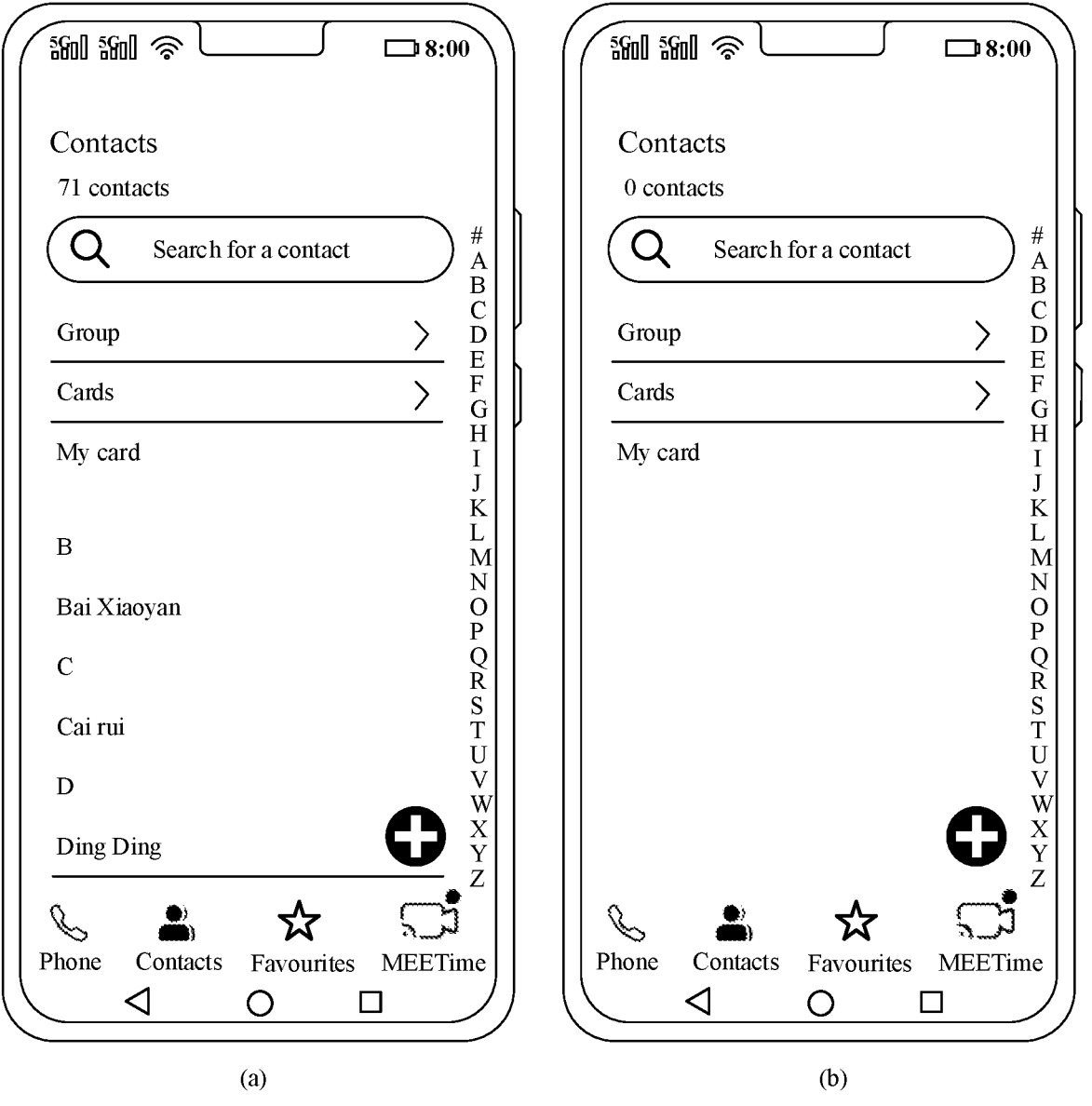
FIG. 5 is a schematic diagram of user interfaces (user interface, UI) presented by an electronic device when a database file of an application "Contacts" is uncorrupted and corrupted.

In FIG. 5, (a) and (b) respectively show user interfaces presented by the electronic device when a database file of an application "Contacts" is uncorrupted and corrupted. As shown in (a) in FIG. 5, when the database file is not corrupted, "Contacts" stores data of 71 contacts, and a user interface displays the 71 contacts. As shown in (b) in FIG. 5, when the database file is corrupted, all data of contacts stored in "Contacts" is lost, and a user interface displays "zero contacts".

In another possible case, when a system is idle, the database file of each application may be detected. For example, a database file in a database of each application may be detected by using management software (for example, a mobile phone manager). The mobile phone management software may access the database of each application. When the mobile phone management software invokes data by using a database interface of each application, if the data cannot be normally accessed, it may be determined that the database file is corrupted.

In still another possible case, the database file is opened by using database management software, a database accessing tool, or the like. If the database file is corrupted, a notification may pop up, notifying the user that the database cannot be accessed.

Figure 6:
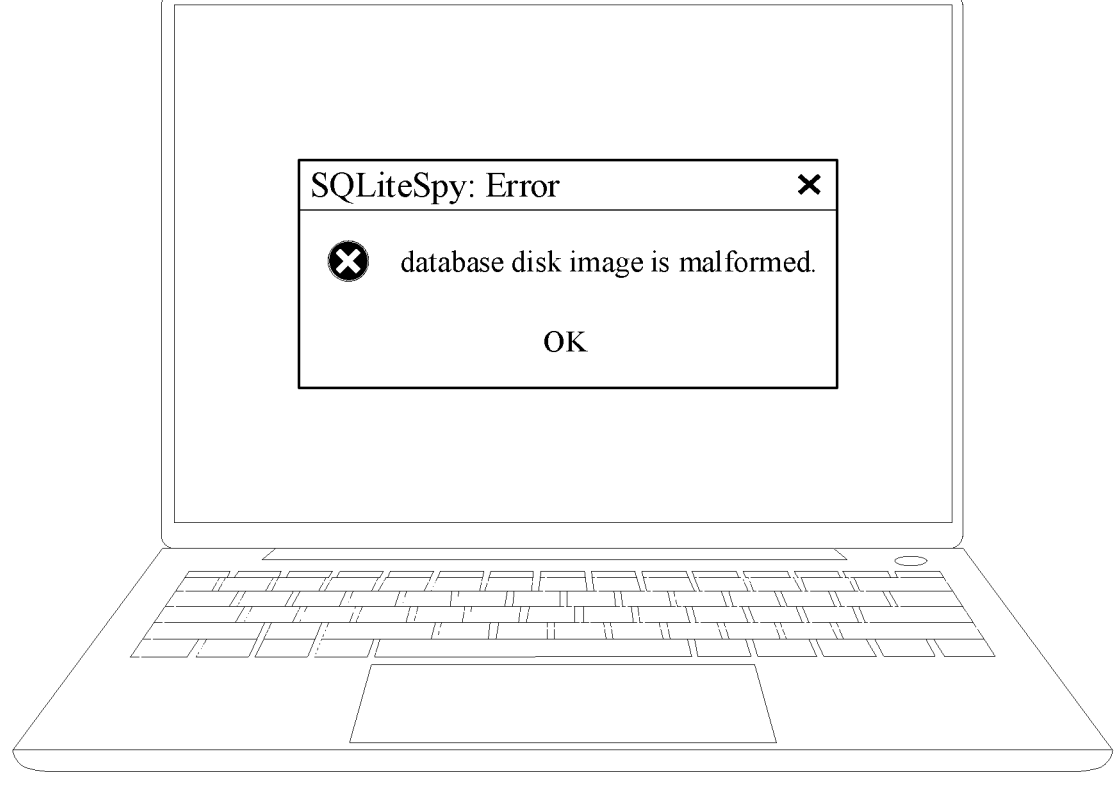
FIG. 6 is a schematic diagram of notifying that a database cannot be accessed.

FIG. 6 shows an example in which the database cannot be accessed. The mobile phone is connected to a computer. When the user attempts to open a corrupted database file by using the database management software, a notification "database disk image is malformed (database disk image is malformed)" may pop up. Consequently, the database cannot be accessed.

It can be understood that a procedure in which management software, an accessing tool, or the like detects or accesses the database file of each application is a procedure in which an electronic device (which may be specifically the processor in the electronic device) on which the management software or the accessing tool is installed executes corresponding code to implement a corresponding function.

It should be understood that the foregoing several cases that may be used to determine that the database file is corrupted are merely examples, and shall not constitute any limitation on this application. The electronic device may determine, in a method in the conventional technology, that the database file is corrupted. For brevity, details are not described herein by using an example.

For ease of distinguishing and description, a corrupted database file is recorded as a first database file.

In the conventional technology, after determining that the database file is corrupted, the electronic device may recreate the database. In other words, the electronic device may delete the first database file, and then newly create a database file based on a structure of the first database file. The newly created database file and the first database file may have a same database structure and a same file name. In other words, when the user accesses the database after the database is recreated, the database that the user accesses is the newly created database file instead of the corrupted database. However, it can be understood that the newly created database file is empty, and all data originally stored in the corrupted database file is lost. The user may perform a subsequent manual input, to complete creation of the database file.

In this embodiment of this application, the electronic device may back up the first database file, to avoid losing all data when the first database file is directly deleted.

In other words, optionally, the method further includes step 420: Back up the corrupted database file (namely, the first database file), to obtain a backup file.

In an implementation, the electronic device may directly rename the first database file. For example, the first database file is named "xxx-corrupted.db". Herein, "xxx" may represent a database file name corresponding to an application, and in this embodiment, represents a name of the first database file, and "corrupted" represents corrupted or corrupted, to be distinguished from a file name "xxx.db" of the first database file. The renamed database file is a backup of the first database file, namely, the backup file.

In another implementation, the electronic device may copy the first database file, and a database file obtained through copying is the backup file. The backup file may also be named in the foregoing manner, to be distinguished from the first database file.

It should be understood that the backup file may alternatively be defined by using another name. This is not limited in this embodiment of this application. As long as the name distinguishes the backup file from the corrupted database file.

The first database file is backed up, to avoid losing all data in the first database file because the first database file is directly deleted when the database is recreated. In a subsequent procedure, the electronic device may obtain some data from the backup file when the some data is not corrupted.

After backing up the first database file, the electronic device may further delete the first database file (namely, a file whose file name is "xxx.db") in a processing manner in the conventional technology, and recreate a new database file. The recreated database file is used to repair the database subsequently (for details, refer to step 440 below).

Because a specific to-be-accessed database file of an application may be predefined, or after an application is installed in the electronic device, a specific to-be-accessed database file may be specified, and a path for accessing the database file may be specified, the recreated database file may be named based on the name of the first database file (for example, may be named "xxx.db"). In other words, the recreated database file replaces the first database file. The recreated database file may be stored in a same directory as the first database file. Subsequently, if a database whose file name is "xxx.db" is accessed, the recreated database file is accessed, or the repaired database file is accessed.

Step 430: Obtain data of at least one field in the corrupted database file (namely, the first database file).

The data of the at least one field in the first database file is some data in the first database file. In a possible design, the data of the at least one field may be important data, or data that the user is concerned about.

For example, for an application "Contacts", key data is usually a name and a telephone number; for an application "Messaging", key data is usually a chatting record; and for an application "Routine", key data is usually a to-do list. For brevity, examples are not listed one by one herein.

For ease of understanding and description, the data of the at least one field is recorded as key data below, the at least one field may be recorded as a key field, and a table used to store the key data may be recorded as a key data table. It can be understood that the key data table includes one or more key fields, and the key field carries the key data.

In the following embodiment, step 430 and step 440 are described in detail by using an example in which the key data is used as the data of the at least one field. However, it should be understood that the data of the at least one field may alternatively be other data, for example, may be implemented by defining different fields in a manner in which the application predefines the different fields, the user customizes the different fields, or the like. This is not limited in this embodiment of this application.

The key data may be defined, for example, based on a setting of the database structure. In an implementation, the application may define data that is in a specific field in a specific table in the database and that is used as the key data. Correspondingly, the field may be referred to as key field, and a table storing the key data may be referred to as a key data table. It can be understood that there may be one or more key fields. There may be one or more key data tables.

In a possible design, the key field may be preconfigured before the electronic device is delivered or before an application developer launches an application in an application market, and possibly cannot be adjusted subsequently. When repairing a database file of the application, an electronic device on which the application is installed may automatically execute a corresponding program, to read data, namely, key data in the key field.

The key field may be determined, for example, based on a definition of a data type and/or a data width of each field in the database structure. For example, a field with a large data width may be defined as a key field, to avoid poor user experience caused when the user repeatedly fills the database file when the database file is corrupted. For another example, the key field may be defined based on a data type of each field, different functions of an application, and data that the user is most concerned about. For example, a field corresponding to the foregoing listed key data corresponding to a different user is defined as a key field.

In another possible design, the key field may alternatively be defined by the user during use of the application, to meet different requirements of different users. For example, when the user starts the application for the first time, the application may remind, by using a user interface (user interface, UI), the user to set the key data. Based on a setting of the user, the application may record a field in which the defined key data is located, in other words, may define the key field. Optionally, in a subsequent use procedure, the user may further adjust the key data based on a change in a requirement, to redefine the key field.

There may be many possible cases in which the database is corrupted. The key data is used as an example. In a possible case, the table (namely, a key data table) storing the key data in the backup file is not corrupted, and the key data in the table is still retained. In another possible case, a table (namely, the key data table) storing the key data in the backup file is corrupted, but the key data in the table is not corrupted, and the key data is still retained. In still another possible case, a table (namely, the key data table) storing the key data in the backup file is corrupted, the key data in the table is also corrupted, and the key data is lost.

Based on whether the key data is retained, the electronic device may obtain the key data in different manners. Optionally, step 430 specifically includes the following steps.

Step 4301: Determine whether the key data in the backup file of the first database file is corrupted.

Step 4302: When the key data in the backup file is not corrupted, obtain the key data from the backup file.

Step 4303: When the key data in the backup file is corrupted, obtain the key data from a master (master) table.

The following describes the foregoing steps in detail.

In step 4301, a possible implementation of determining whether the key data in the backup file of the first database file is corrupted is determining whether the key data table in the backup file is corrupted. For ease of distinguishing and description, the key data table in the backup file is recorded as a second data table. It can be understood that the second data table may be obtained by backing up the first database file. Therefore, if the key data in the backup file is corrupted, it means that the key data in the first database file is corrupted; and if the key data table (namely, the second data table) in the backup file is corrupted, it means that the key data table in the first database file is corrupted.

In a possible case, if the second data table in the backup file of the first database file is corrupted, data in the second data table cannot be read. Therefore, it may be considered that the key data in the backup file is corrupted or lost. In In step 4303, that the key data in the backup file is corrupted may be that the key data table (namely, the second data table) cannot be accessed, or may be that the key data table (namely, the second data table) in the backup file is partially or completely corrupted, and the corrupted data includes the key data. In this case, the key data may be obtained from the master table.

Herein, master represents a file stored in a directory different from that of the first database file and the backup file of the first database file in the database. The master table may store all information in the first database file, for example, include all table information, and statements such as table creation and insertion.

The following shows an example of an SQL statement obtained from the master table.

```
CREATE TABLE data (_id INTEGER PRIMARY KEY
AUTOINCREMENT,package_id INTEGER REFERENCES
package(_id),mimetype_id INTEGER REFERENCES mimetype(_id) NOT
NULL,raw_contact_id INTEGER REFERENCES raw_contacts(_id) NOT
NULL,hash_id TEXT,is_read_only INTEGER NOT NULL DEFAULT 0,is_primary
INTEGER NOT NULL DEFAULT 0,is_super_primary INTEGER NOT NULL
DEFAULT 0,data_version INTEGER NOT NULL DEFAULT 0,data1 TEXT,data2
TEXT,data3 TEXT,data4 TEXT,data5 TEXT,data6 TEXT,data7 TEXT,data8
TEXT,data9 TEXT,data10 TEXT,data11 TEXT,data12 TEXT,data13 TEXT,data14
TEXT,data15 TEXT,data_sync1 TEXT, data_sync2 TEXT, data_sync3 TEXT,
data_sync4 TEXT, carrier_presence INTEGER NOT NULL DEFAULT 0);
INSERT INTO data
VALUES(3,NULL,5,3,'log6TBlQUmRdA1ls4SasINToeWg=',0,0,0,1,'132
98364512','2',NULL,'+8613298364512',NULL,'Zhengzhou, Henan
',NULL,NULL,NULL,NULL,
NULL,NULL,NULL,NULL,NULL,NULL,NULL,NULL,NULL,0);
INSERT INTO data
VALUES(4,NULL,7,3,'sSHRM2Se/X0FMjtdJeFkiX81tu4=',0,0,0,0,'Hu
Wen','Hu Wen
',NULL,NULL,NULL,NULL,NULL,NULL,NULL,'2','0',NULL,NULL,NULL,
NULL,NULL,NULL,NULL,NULL,0)
``` step 4302, the electronic device may obtain the key data from the backup file when the key data table in the backup file of the first database file is not corrupted.

In an example of step 4301 and step 4302, the electronic device may search the backup file for the second data table by automatically executing a query (select) statement. If the second data table is not corrupted, the second data table may be found; or if the second data table is corrupted, an error may be returned, and data in the second data table cannot be read.

After finding the second data table from the backup file, the electronic device may automatically execute a query statement again, to find the key data from the key field of the second data table. In this way, the key data may be obtained from the backup file.

It should be understood that the procedure in which whether the key data is corrupted is determined based on whether the key data table (namely, the second data table) in the backup file is corrupted and the key data is obtained from the key data table and that is described with reference to step 4301 and step 4302 is merely a possible implementation, and shall not constitute any limitation on this application.

In another possible implementation, the electronic device may alternatively directly search for the key data, for example, may alternatively automatically run a query statement. If the key data is not corrupted, the key data can be found; and if the key data is corrupted, an error may be returned, and the key data cannot be read.

It can be learned that the master table includes a statement for creating a data table and a statement for inserting data into the data table. It should be understood that the foregoing descriptions are merely examples, and shall not constitute any limitation on this application. A person skilled in the art may understand that the foregoing shows only some statements in the master table, instead of all statements in the master table. A quantity of statements stored in the master table varies with an amount of data stored in the database. This is not limited in this embodiment of this application.

For example, the electronic device may obtain the key data from the master table. However, it can be understood that an association relationship between the data is not clear, and then the application may generate a new key data table based on an SQL statement that is used to create the key data table in the first database file and that is recorded in the master table. It should be noted that the newly generated key data table is generated based on the data obtained from the master, and is not the second data table found from the backup file or the key data table in the first database file. However, it can be understood that these key data tables all include same key data.

In a specific implementation, for example, the electronic device may obtain the data in the key data table by automatically executing a search statement and setting a filter condition, and then execute a table creation statement to create the key data table. It should be understood that executing the table creation statement to create the key data table is to re-execute a related statement in the master table.

It should be further understood that the electronic device may obtain all data in the key data table, or may obtain only the key data in the key data table. This is not limited in this application. However, it can be understood that a procedure of obtaining data from the master table and creating a table is a time-consuming procedure, and time consumption may be reduced as much as possible by reducing a data amount. Therefore, obtaining the key data in the key data table may be preferentially considered.

In this embodiment, the key data table may be stored in a same directory as the master table.

It should be noted that both the backup file and the master table are database files of a same application, and may be stored in a same database, for example, stored in different directories of a same database.

It should be understood that step 4301 to step 4303 are separately described based on whether the key data in the backup file is corrupted. Therefore, not all of step 4301 to step 4303 need to be performed.

In step 440, the obtained data (for example, the key data) of the at least one field is inserted into the newly created database file, to obtain the repaired database file.

Herein, the newly created database file may be a database file that is automatically recreated by the electronic device after the electronic device determines that the first database file is corrupted. As described in step 420, the step of recreating the new database file may be performed after the first database file is backed up in step 420. For example, the step and step 430 may be performed simultaneously, or the step may be performed before or after step 430. This is not limited in this embodiment of this application. It can be understood that the newly created database file is created based on a structure corresponding to the first database file. For a definition of a data type, a data size, or the like corresponding to each field in each table, refer to a structure of the corrupted database file. In addition, the newly created database file and the first database file have a same file name, for example, "xxx. db" in the foregoing example, and may be stored in a same directory.

Then, the electronic device may insert the obtained data (for example, the listed key data) of the at least one field into the newly created database file. For example, the electronic device may insert the key data into a corresponding key field in the newly created key data table by automatically executing an insertion statement, to obtain the repaired key data table. For ease of distinguishing and description, the repaired key data table is the first data table. Therefore, the user can still view the key data when opening the application. For example, the key data of the application "Contacts" is the name and the telephone number. If the database file of the application is self-repaired, the user may still view a name and a telephone number of a previously stored contact when opening the application "Contacts".

Subsequently, the electronic device may further generate another table related to the application. The application "Contacts" is used as an example. The electronic device may further generate some tables related to the user interface. For example, the tables include but are not limited to a table used to display account information, a table used to display a nickname, a table used to display a profile picture, a table used to display a group to which a contact belongs, a table used to accelerate a search (for example, may include Pinyin used for sorting), and a table used to display a ringtone. The electronic device may further generate some tables related to a third-party application. For example, the tables include but are not limited to a table used to store an account such as a WeChat account or a QQ account. For brevity, examples are not listed one by one herein. The electronic device may further automatically associate a contact and a telephone number in the key data table with another table, for example, by using the foregoing raw contact identifier (raw_contact_id), to display more comprehensive information about the contact by using the user interface. Therefore, the self-repaired database file can be obtained. It should be understood that for a procedure in which the electronic device generates the another table related to the application and associates the key data with the another table, refer to a specific implementation in the conventional technology. For brevity, details are not described herein. It should be further understood that the table generated by the electronic device is not limited to the foregoing examples. The foregoing listed tables are merely examples, and should not constitute any limitation on this embodiment of this application.

Based on the foregoing repairing, the repaired database may be obtained. In this embodiment, for ease of distinguishing and description, the database file obtained through repairing is recorded as a second database file. It should be understood that the second database file is obtained through repairing based on the newly created database file. The first data table may exist in the second database file. Certainly, the second database file may further include another table automatically generated by the electronic device (reference is made to the foregoing examples). This is not limited in this embodiment of this application.

Certainly, the electronic device may further obtain, from the master table, data used to create the another table, and obtain, from the master table, a statement used to create the another table and an insertion statement, to complete creation of the another table in the database file. It can be learned through comparison that, less time is consumed when the application automatically generates the another table, but more time is consumed when another table is recreated based on the data in the master table.

When determining that the first database file is corrupted, the electronic device may even directly obtain all information in the first database file from the master table, for example, including all table information and data and statements used to create a table, to restore the first database file.

If the user fills in other data subsequently, for example, adding a new contact, or supplementing data of an existing contact, the user may update the database file.

It can be learned through an experiment that, if the key data is directly obtained from the backup file and the repaired database file is automatically generated, it may take only approximately 20 seconds. If the key data is obtained from the master table and then the repaired database file is generated, it may take only approximately 1 minute.

It should be understood that the master table is merely a possible name of a file used to store all data in the database file, and shall not constitute any limitation on this application. In this application, a possibility of restoring the key data by using another file that may be used to store all data in the database file is not excluded.

It should be further understood that, for ease of understanding and description, the foregoing describes a specific procedure of this embodiment by using obtaining the key data as an example. However, this should not constitute any limitation on this application. The key data is merely an example. The electronic device may obtain data of at least one predefined field in the corrupted database file by using the foregoing method procedure. For brevity, details are not described herein by using an example.

Based on the foregoing technical solutions, in this embodiment of this application, when the database file is corrupted, some data such as key data in the database file is automatically obtained, and some data tables such as the key data table in the database file are automatically repaired, to repair the database file. A short period of time is consumed to repair the data table, but it is of great significance for repairing the database file. Although the database file is corrupted, the user may still obtain some data in a short period of time, and does not need to repeatedly enter the data. The user does not need to repeatedly enter at least all the data originally stored in the database. A subsequent procedure of repairing the database file is almost unaware to the user. This can avoid interference generated when the user uses the electronic device. Generally, user experience is greatly improved.

To better understand this embodiment of this application, the application "Contacts" is used as an example below to describe the method provided in this embodiment of this application.

The database file of the application "Contacts" may include one data (data) table, one contact (contacts) table, and one raw contact (raw_contacts) table. The data table of a same contact can be determined, or a telephone number can be mapped onto a name of a contact of the telephone number.

Table 1 shows an example of a data table existing when a database file of an application "Contacts" is not corrupted. It should be understood that the data table is the key data table in the database file. The data table shown in Table 1 shows some columns of the data table in the database file of the "Contacts", but does not show all columns of the data table. For example, the data table further includes a hash identifier (hash_id) column, a column indicating whether data is read-only (is_read_only), a data version (data_version) column, a data3 column to a data5 column, and a data7 column to a data15 column. For brevity, examples are not listed one by one herein. Because these columns are not mentioned in embodiments of this application, the columns are not shown in the table. In addition, the data table shown in Table 1 is merely an example. In some operating systems, a structure of the data table is shown in Table 1, or may be obtained by performing equivalent transformation on Table 1. In some other operating systems, the data table may alternatively have another structure. This is not limited in this application.

TABLE 1

| mimetype_id | raw_contact_id | data1 | data2 | ... | data6 | ... |
|---|---|---|---|---|---|---|
| 7 | 1 | Hu Wen | | | | |
| 5 | 1 | 13******512 | 2 | | Zhengzhou, Henan | |
| 7 | 2 | Zhang Li | | | | |
| 5 | 2 | 13******455 | 2 | | Zhengzhou, Henan | |
| 7 | 3 | Bai Xiaoyan | | | | |
| 5 | 3 | 18******629 | 2 | | Xi'an, Shanxi | |
| 7 | 4 | Ding Ding | | | | |
| 5 | 4 | 15******012 | 2 | | Xi'an, Shanxi | | may store all information about all created contacts. Each row in the table stores a specific type of information, for example, a name, a telephone number, an email box (E-mail), or an address. For each row, a specific type of data stored in the row may be identified by using a multipurpose internet mail extension (multipurpose internet mail extension, mime) type identifier (identifier, id) (namely, mimetype_id) field. A mime type (mime type) table is cited for the field, and the mime type table stores a common data type.

For example, all the information about the contacts in the data table may be stored in a data1 column to a data15 column, and content stored in each column varies with mimetype_id. For example, a row corresponding to mimetype_id=5 may store a telephone number. The data1 column may store the telephone number, and a data2 column may store a telephone number type (for example, a mobile number, a home number, and a work number). For example, data2=2 indicates a mobile number. A data6 column may store a home location of a telephone number. For another example, a row corresponding to mimetype_id=7 may store a name.

In addition, for each row of the data table, a raw_contact_id field may be further used to identify that data stored in the row corresponds to an ID in the raw_contact table. In the data table, a plurality of rows of data with a same ID in the raw_contact_id field may correspond to a same contact. For example, a row corresponding to mimetype=7 records a name of a contact, and a row corresponding to mimetype=5 records a telephone number of the contact. Two lines with a same raw_contact_id field are associated, so that an association relationship between a name and a telephone number It can be learned that every two rows whose raw_contact_id fields are each of 1, 2, 3, and 4 correspond to one contact. For example, based on an association relationship between two rows corresponding to raw_contact_id=1, it may be determined that a mobile number of Hu Wen is 13******512, and a home location of the mobile number is Zhengzhou, Henan.

With reference to the foregoing descriptions, the key data of "Contacts" is the name and the telephone number, and it can be found that the key data in the data table is mainly in the data1 column.

In addition, the name and the telephone number are inserted into two rows in the data table, and the contact and the telephone number need to be associated by using raw_contact_id. Therefore, for the key data table such as Table 1, the key data may include raw_contact_id, the name, and the telephone number. In other words, the key field includes the raw_contact_id field and a data1 field.

With reference to the foregoing embodiment, when Table 1 is not corrupted, key data such as data of the raw_contact_id field and the data1 field in Table 1 may be directly obtained from Table 1. When Table 1 is corrupted, the key data may be obtained from the master table.

Subsequently, the electronic device may insert the key data into the newly created database, to obtain the repaired key data table, and further obtain the repaired database.

In addition, because the database may be accessed by a third party, there is a risk that the database may be tampered with. To ensure authenticity and correctness of the key data in the key data table, the key data may be further verified based on a RawContacts table in the database. In this case, the key data table may include the data table and the RawContacts table.

For example, when reading the key data from the data table, or after obtaining the key data, the application may determine whether the RawContacts table stores data whose raw_contact_id is the same as raw_contact_id read from the data table. In this example, raw_contact_id read from the data table includes 1, 2, 3, and 4. If the RawContacts table stores the data, it indicates that the key data is correct. If the RawContacts table does not store some data, for example, does not store data whose raw_contact_id is 1, it indicates that the data whose raw_contact_id is 1 may be inauthentic.

Table 2 shows an example of the RawContacts table. It should be understood that the RawContacts table shown in Table 2 is merely an example, and shows only some columns in the table, instead of all columns. The RawContacts table shown in Table 2 shows some columns of a RawContacts table in the database file of "Contacts", instead of all columns of the RawContacts table. As shown in Table 2, the RawContacts table includes, for example, a contact identifier (contact_id) column, a display name (display_name) column, a custom ringtone (custom_ringtone) column, a column indicating whether to send to a voicemail (send_to_voicemail), and a column indicating a quantity of calls (x_time_contacts). Although not shown in the table, the RawContacts table may further include a column indicating a last contact time point (x_last_time contact), or the like. For brevity, examples are not listed one by one herein. In addition, the RawContacts table shown in Table 2 is merely an example. In some operating systems, a structure of the RawContacts table may be shown in Table 2, or may be obtained by performing equivalent transformation on Table 2. In some other operating systems, the RawContacts table may alternatively have another structure. This is not limited in this application.

implementation used to implement the method provided in this application, and should not constitute any limitation on this application. In another implementation, after obtaining the key data (namely, an example of the data of the at least one field) from the master table and generating the key data table, the electronic device may back up the key data table as the corrupted database file, to obtain a new backup file. Then, whether key data in the new backup file is corrupted is determined. Because a key data table restored from the master table is stored as a new backup file, it may be determined that key data in the backup file is not corrupted, and then the database file may be repaired based on the procedure described in step 4302 and step 440. The following briefly describes a specific procedure with reference to FIG. 7.

FIG. 7 is a schematic flowchart of a database repairing method 700 according to another embodiment of this application. As shown in FIG. 7, the method 700 may include step 710 to step 770.

Step 710: Determined that a database file is corrupted.

Step 720: Back up the corrupted database file, to obtain a backup file.

Step 730: Determine whether key data in the backup file is corrupted.

Step 740: If the key data in the backup file is not corrupted, obtain the key data from the backup file.

It should be understood that, for a specific procedure of step 710 to step 740, refer to related descriptions of step 410, step 420, step 4301, and step 4302 in the foregoing method 400. For brevity, details are not described herein again.

For ease of distinguishing, the corrupted database file in step 710 is recorded as a first database file. It should be noted that, when an electronic device performs step 720 for a first time after performing step 710 to determine the first database file, the backup file is obtained by backing up the corrupted database file, and is different from a backup file

TABLE 2

| contact_id | display_name | custom_ringtone | send_to_voicemail | x_time_contacts |
|---|---|---|---|---|
| 2 | Lili | | 0 | 2 |
| 3 | Xiaoyan | | 0 | 3 |
| 4 | Ding Ding | | 0 | 1 |

For a same contact, a value of raw_contact_id in the data table is equal to a value of contact_id in the RawContacts table. For example, raw_contact_id=2 in Table 1 and contact_id=2 in Table 2 correspond to a same contact. The contact is Zhang Li, and a displayed name is Lili.

It can be learned that Table 2 includes only data whose contact_id is 2, 3, and 4, and does not include data whose contact_id is 1. In this case, it can be considered the data whose raw_contact_id is 1 and that is read from the data table is not key data. The key data table generated subsequently may not include the data corresponding to raw_contact_id=1.

It should be understood that, in the foregoing embodiments, for ease of understanding and description only, "Contacts" is used as an example to describe a specific procedure in detail. However, this should not constitute any limitation on this application. An application to which the database repairing method is applicable is not limited in this application. Based on a same concept, the method may be used in different applications, to implement self-repairing of the database.

It should be further understood that the procedure described with reference to FIG. 4 is merely a possible subsequently described in step 760. For ease of distinguishing and understanding, the backup file obtained when step 720 is performed for the first time is recorded as a backup file 1, and the backup file obtained by performing step 760 is recorded as a backup file 2. It can be understood that the backup file 1 is a backup file obtained by backing up the corrupted first database file.

Step 750: If the key data in the backup file (namely, the backup file 1) is corrupted, obtain the key data from a master table.

Step 760: Generate a key data table based on the key data obtained from the master table, and back up the key data table, to obtain the backup file (namely, a backup file 2).

In other words, the key data table generated based on the key data obtained from the master table may also be backed up in a directory of the backup file 1 obtained in step 720, to be stored as a new backup file. It should be noted that, before the backup file 2 is obtained in step 760, because it is determined in step 730 that the key data in the backup file 1 is corrupted, the backup file 1 is deleted. In other words, the backup file 2 replaces the backup file 1.

In another implementation, the key data table generated based on the key data obtained from the master table may be understood as the corrupted database file. It should be noted that the corrupted database file obtained herein is not the first database file in step 710, but is the corrupted database file obtained through repairing based on the master table. The electronic device may perform step 720 again to back up the corrupted database file, to obtain the backup file, and delete the corrupted database file. In this way, an old backup file is replaced with a new backup file. Although not shown in the figure, it can be understood that a same objective may be achieved in the foregoing two implementations. To be specific, the new backup file (namely, the backup file 2) is obtained. A specific implementation of obtaining the new backup file is not limited in this application.

Subsequently, the electronic device may repeatedly perform step 730, and when the backup file is not corrupted, continue to perform step 740, to obtain the key data from the backup file.

It can be understood that when the electronic device performs step 730 and step 740 this time, the backup file is the backup file 2.

Step 770: Insert the key data into a newly created database file, to obtain a repaired database file.

The repaired database file may be recorded as a second database file. The second database file and the first database file may have a same file name and a same format. In other words, the second database file replaces the first database file.

It should be understood that for a specific procedure of step 770, refer to related descriptions of step 440 in the foregoing method 400. For brevity, details are not described herein again.

It should be further understood that step 730 to step 760 are separately described based on whether the key data in the backup file is corrupted. Therefore, not all of step 730 to step 760 need to be performed.

It should be further understood that, for ease of understanding and description, the foregoing describes a specific procedure of this embodiment by using obtaining the key data as an example. However, this should not constitute any limitation on this application. The key data is merely an example. The electronic device may obtain data of at least one predefined field in the corrupted database file by using the foregoing method procedure. For brevity, details are not described herein by using an example.

Based on the foregoing technical solutions, in this embodiment of this application, when the database file is corrupted, some data such as key data in the database file is automatically obtained, and some data tables such as the key data table in the database file are automatically repaired, to repair the database file. A short period of time is consumed to repair the data table, but it is of great significance for repairing the database file. Although the database file is corrupted, a user may still obtain some data in a short period of time, and does not need to repeatedly enter the data. The user does not need to repeatedly enter at least all data originally stored in a database. A subsequent procedure of repairing the database file is almost unaware to the user, to avoid interference generated when the user uses the electronic device. Generally, user experience is greatly improved.

In a possible scenario, when a system is idle, a database file of each application is detected. When it is detected that a database file of an application is corrupted, key data may be obtained by performing the method in the method 400 or the method 700, and then the key data is inserted into the newly created database file, to implement self-repairing of the database file. Such a repairing procedure is short, and the user is unaware of the entire repairing process.

It should be understood that, steps in the methods can be implemented by using a hardware integrated logical circuit in the processor, or by using instructions in a form of software. The steps in the methods disclosed with reference to embodiments of this application may be directly performed and completed by a hardware processor, or may be performed and completed by a combination of hardware and a software module in the processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

This application further provides a database repairing apparatus. The repairing apparatus may include modules or units configured to execute procedures in the method embodiments. It should be understood that these modules or units may implement corresponding functions by executing a computer program (which may also be referred to as code or instructions). The computer program may be provided by an application, or the computer program may be provided by an electronic device on which the application is installed. This is not limited in this application.

This application further provides an electronic device. An application is installed in the electronic device, and the application may store data by using a corresponding database. The electronic device may include a memory and a processor. The memory may be configured to store a computer program. The processor may be configured to invoke the computer program in the memory, so that the electronic device performs the method in the embodiment shown in FIG. 4 or FIG. 7.

This application further provides a computer program product. The computer program product includes a computer program (which may also be referred to as code or instructions). When the computer program is run, an electronic device is enabled to perform the method in the embodiment shown in FIG. 4 or FIG. 7.

This application further provides a computer-readable storage medium. The computer-readable storage medium stores a computer program (which may also be referred to as code or instructions). When the computer program is run, the electronic device is enabled to perform the method in the embodiment shown in FIG. 4 or FIG. 7.

It should be understood that, the processor in embodiments of this application may be an integrated circuit chip, and has a signal processing capability. In an implementation process, steps in the method embodiments are implemented by using a hardware integrated logic circuit in the processor, or by using instructions in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor, or the like.

The steps in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It should be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and methods described in this specification includes but is not limited to these and any memory of another proper type.

Terms such as "unit" and "module" used in this specification may be used to indicate computer-related entities, hardware, firmware, combinations of hardware and software, software, or software being executed.

A person of ordinary skill in the art may be aware that, in combination with illustrative logical blocks (illustrative logical block) and steps (step) described in embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement, to achieve objectives of the solutions of embodiments.

In addition, functional units in embodiments of this application may be integrated into one processing unit, each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line (DSL)) or a wireless manner (for example, infrared, radio, or microwave). The computer-readable storage medium may be any usable medium that can be accessed by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that may store program code such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A database repairing method, comprising:
in response to determining that a first database file and a second data table in a backup file of the first database file are corrupted, backing up the first database file to obtain a backup file of the first database file;
obtaining data of at least one field in the first database file from a master table, wherein the master table stores a structured query language (SQL) statement for generating a first data table which is a repaired version of the second data table, and wherein the at least one field is predefined by an application;
in response to determining that a second data table in the backup file that stores the data of the at least one field is not corrupted, obtaining the data of the at least one field from the second data table;
in response to determining that the second data table in the backup file is corrupted, obtaining the data of the at least one field from a master table associated with the first database file, the master table storing statements and data used to generate the first database file, and reconstructing a key data table by re-executing the statements for the key data table;
creating, in response to the first database file being corrupted, a second database file having a same file name and a same structure as the first database file; and
generating the first data table to obtain a in the second database file based on the data of the at least one field, wherein the second database file comprises the first data table and is a repaired version of the first database file and replaces the first data file, and wherein the first database file and the second database file are stored in a database.

2. The method according to claim 1, wherein the SQL statement comprises one or more of an update statement, an insertion statement, a deletion statement, or a query statement.

3. The method according to claim 1, wherein the method further comprises:
deleting the first database file.

4. The method according to claim 1, wherein the database is a structured query language lite (SQLite) database.

5. The method according to claim 1, wherein a computer program for implementing the method is provided by the application.

6. The method according to claim 1, wherein a computer program for implementing the method is provided by an electronic device on which the application is installed.

7. An electronic device comprising:
at least one processor; and
a memory coupled to the at least one processor and storing programming instructions for execution by the at least one processor to cause the electronic device to perform operations comprising:
in response to determining that a first database file and a second data table in a backup file of the first database file are corrupted, backing up the first database file to obtain a backup file of the first database file;
obtaining data of at least one field in the first database file from a master table, wherein the master table stores a structured query language (SQL) statement for generating a first data table which is a repaired version of the second data table, and wherein the at least one field is predefined by an application;
in response to determining that a second data table in the backup file that stores the data of the at least one field is not corrupted, obtaining the data of the at least one field from the second data table;
in response to determining that the second data table in the backup file is corrupted, obtaining the data of the at least one field from a master table associated with the first database file, the master table storing statements and data used to generate the first database file, and reconstructing a key data table by re-executing the statements for the key data table;
creating, in response to the first database file being corrupted, a second database file having a same file name and a same structure as the first database file; and
generating the first data table to obtain a in the second database file based on the data of the at least one field, wherein the second database file comprises the first data table and is a repaired version of the first database file and replaces the first data file, and wherein the first database file and the second database file are stored in a database.

8. The electronic device according to claim 7, wherein the SQL statement comprises one or more of an update statement, an insertion statement, a deletion statement, or a query statement.

9. The electronic device according to claim 7, wherein the method further comprises:
deleting the first database file.

10. The electronic device according to claim 7, wherein the database is a structured query language lite (SQLite) database.

11. The electronic device according to claim 7, wherein a computer program for implementing the method is provided by the application.

12. The electronic device according to claim 7, wherein a computer program for implementing the method is provided by an electronic device on which the application is installed.

* * * * *